United States Patent [19]

Kato et al.

[11] Patent Number: 4,934,781
[45] Date of Patent: Jun. 19, 1990

[54] LIGHT DEFLECTING SYSTEM WITH ROTATING MIRROR

[75] Inventors: Shigeo Kato, Mitaka; Susumu Saito; Yasuhide Matsumura, both of Hachioji; Gyozo Toda, Hino, all of Japan

[73] Assignees: Hitachi, Ltd.; Hitachi Koki Co., Ltd., both of Tokyo, Japan

[21] Appl. No.: 304,554

[22] Filed: Feb. 1, 1989

[30] Foreign Application Priority Data

Feb. 5, 1988 [JP] Japan .................................. 63-23679

[51] Int. Cl.⁵ ........................ G02B 26/10; H02K 5/16
[52] U.S. Cl. ..................................... 350/6.8; 310/90.5
[58] Field of Search ................... 350/6.1, 6.2, 6.3, 6.4, 350/6.5, 6.6, 6.7, 6.8, 6.9, 6.91, 484, 485, 486, 487; 384/111, 114, 118, 119; 310/90.5

[56] References Cited

U.S. PATENT DOCUMENTS 3,874,778 4/1975 Kato et al. ........................ 350/6.91

Primary Examiner—Bruce Y. Arnold
Assistant Examiner—Ronald M. Kachmarik
Attorney, Agent, or Firm—Fay, Sharpe, Beall, Fagan, Minnich & McKee

[57] ABSTRACT

The rotating mirror light deflecting system employs a non-circular dynamic gas bearing providing dynamic pressure to radially support the shaft. The bearing is provided internally with a multiplicity of grooves or embankments whereby dynamic gas pressure is increased to enhance rigidity. The bearing radially moves as a whole with damping according to a movement of the shaft, thus permitting nondestructive movement of the shaft and absorption of the resonant energy of the shaft. The shaft and the bearing will not come in contact with each other, and oscillation energy of the shaft is absorbed or dissipated by an external viscous or hysteresis resistance of the bearing therefore resonance oscillation is attenuated on the instant it occurs. Since the resonance point is high due to bearing surface rigidity, whirling is hard to arise, however, if whirling does arise, then the bearing and the shaft move together to attenuate oscillation energy of the shaft, therefore oscillation and whirling is put down immediately.

20 Claims, 3 Drawing Sheets

LIGHT DEFLECTING SYSTEM WITH ROTATING MIRROR

BACKGROUND OF THE INVENTION

This invention relates to a light scanning system with a rotating mirror, more specifically, it is intended for light deflection from mechanically rotating a polygonal mirror.

Rotation is required as high as possible for a recent rotating mirror light deflecting system for scanning to obtain a high resolution. To realize such high-speed rotation, a bearing with less friction has been used. As disclosed in U.S. Pat. No. 3,874,778, for example, a magnetic bearing has been used for the thrust bearing, and a tilting pad dynamic gas bearing has been used for the journal bearing.

SUMMARY

To explain the present invention a hypothetical structure similar to that of U.S. Pat. No. 3,874,778 will be analyzed and shown in FIG. 5. A polygon mirror 31 is mounted on a shaft 32. A motor rotor 33 and a rotary magnet 34 of a repulsion type thrust magnetic bearing are mounted to the shaft 32. The shaft is supported vertically against gravity by repulsion of the rotary magnet 34 With a static magnet 35 magnetized counter to the rotary magnet 34. The motor rotor 33 on the shaft 32 is subjected to a rotating field by a motor stator 36. For rotational support of the shaft, tilting pads 39 are attached to the inside of a pivots 38 projecting radially inward from a fixed casing 37. The shaft 32 is supported radially by the tilting pad gas bearing. FIG. 6 is a transverse sectional view taken on line X—X of FIG. 5, whereby the positional relation among casing 37, pivot 38, tilting pad 39, and shaft 32 will be understood.

Thus, the following problem was found to be inherent in the rotating mirror light deflecting system as represented by FIG. 5 wherein the weight of the shaft and attached structure is supported on the magnetic bearing, and the tilting pad gas bearing works as a journal bearing.

That is, the tilting pad dynamic gas bearing has a small portion on which to support the shaft due to the split bearing, therefore rigidity is not satisfactory. Further, since the pivot point of the pad of the bearing is fixed directly on the casing through the rigid pivot 38, the pad is not capable of following a large movement of the shaft 32. At the time of resonance, at a first rotational speed or frequency when the shaft oscillates violently, the shaft is capable of easily coming in contact with the bearing pad to cause a fault. Then, a whirling oscillation may arise at a rotational frequency two times or more as high as the resonance frequency. Since the bearing rigidity is small, the whirling oscillation is generated even at a low rotational speed and, once whirling arises, the oscillation energy cannot be dissipated or damped sufficiently to prevent the shaft from colliding violently against the bearing pad. As described, there is an unavoidable problem such that a rotating mirror light deflecting system in super high-speed rotation, which is required, particularly of late, cannot be realized with the prior art type of journal bearing system.

The invention includes the analysis of the circumstances mentioned above, and its object is to provide a rotating mirror light-deflecting system capable of rotating at high speed, wherein the shaft Will never come in contact With the journal bearing, particularly due to a Whirling phenomenon generated at a rotational frequency or with a large oscillation at the time of resonance.

To attain the aforementioned object, the rotating mirror light deflecting system of the invention employs à non-circular dynamic gas bearing providing dynamic pressure to radially support the shaft, particularly through a rigidity much larger than the tilting pad bearing used as the prior art journal bearing. The bearing is provided internally With a multiplicity of grooves or embankments whereby dynamic gas pressure is further increased to enhance rigidity. Further, the construction is such that the bearing radially moves as a Whole with damping according to a movement of the shaft, thus permitting nondestructive movement of the shaft and absorption of the resonant energy of the shaft.

The non-circular dynamic bearing provided with a multiplicity of grooves is high in rigidity, therefore a resonance rotational frequency can be made extremely high. Then, since the rigidity is high, the shaft will never come in contact with the bearing surface from its oscillation at the time of resonance. The bearing is supported on an elastic body having hysteresis such as a damping spring or damping rubber or a viscous damping elastic body. Further, a viscous fluid such as oil, grease or the like may be provided between the bearing and the casing to absorb energy from resonant shaft movement. Accordingly, if the shaft oscillates violently at resonance, the journal bearing starts to oscillate in phase with the shaft. As a result, the shaft and the bearing will not come in contact with each other, and oscillation energy of the shaft is absorbed or dissipated by an external viscous or hysteresis resistance of the bearing, therefore resonance oscillation is attenuated on the instant it occurs. Since the resonance point is high due to bearing surface rigidity, whirling is hard to arise, however, if whirling does arise, then the bearing and the shaft move together to attenuate oscillation energy of the shaft, therefore oscillation and whirling is put down immediately. This ensures that the rotation is stable and at a considerably high rotational frequency.

BRIEF DESCRIPTION OF THE DRAWINGS

Preferred embodiments of the invention will now be described with reference to the accompanying drawings.

DETAILED DESCRIPTION OF THE PREFERRED EMBODIMENT

Figure 1:
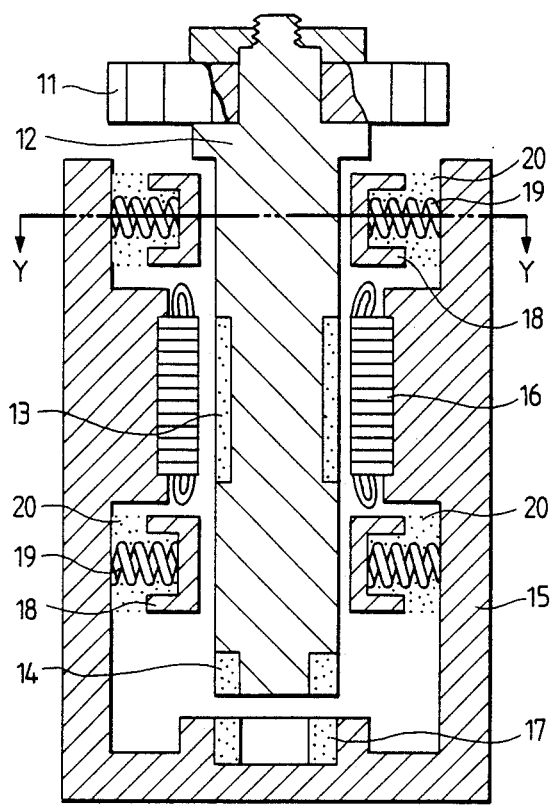
FIG. 1 is a longitudinal sectional view of a rotating mirror light deflecting system according to one embodiment of the invention.

FIG. 1 is a longitudinal sectional view of a rotating mirror light-deflecting system given in one embodiment of the invention. A polygon mirror 11 is mounted on a shaft 12. A rotor 13 of a motor and a rotary magnet 14 of a magnetic bearing are mounted on the shaft. A stator 16 of the motor and a fixed magnet 17 for supporting the weight of the shaft are fixed on a rigid cup shaped casing 15. The shaft is radially supported on two non-circular dynamic pressure gas journal bearing members 18, which are spaced apart vertically on opposite sides of the stator 16. Since the journal bearing member 18 are borne by several pieces of elastic bodies 19 such as springs or the like against the casing, the journal bearings are capable of moving radially according to movement of the shaft. A viscous body 20 such as oil, grease or the like is provided between the casing and the journal bearings to provide damping; therefore oscillation energy of the shaft is absorbed.

Figure 2:
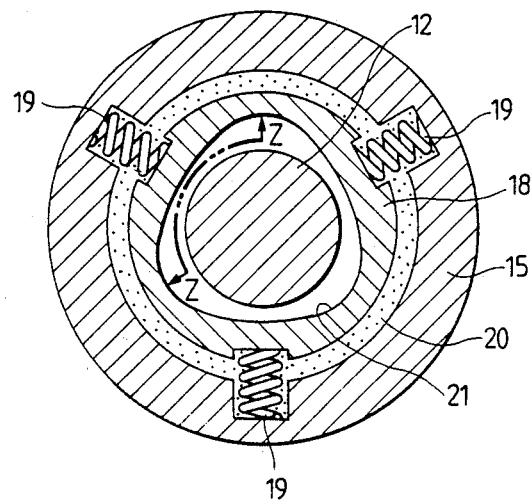
FIG. 2 is a sectional view taken on line Y—Y of FIG. 1.
Figure 3:
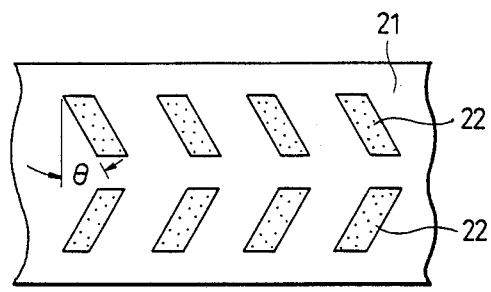
FIG. 3 is an explanatory drawing taken along line Z—Z in FIG. 2 showing a bearing surface.

FIG. 2 is a cross sectional view taken on line Y—Y in FIG. 1. While the journal bearing member 18 and the shaft 12 are concentric, the shape of a bearing surface 21 of the rigid annular journal bearing member 18 is non-circular to provide the dynamic gas pressure. In the drawing, bearing surface 21 is shaped like a triple circle for which three circles each having a diameter somewhat larger than the journal diameter are connected. A multiplicity of grooves 22 shown in FIG. 3 are provided on the bearing surface 21. The grooves are disposed at 15° to 45° in angle relative to the axial direction of the shaft. The grooves 22 are disposed so as to further enhance a rise of dynamic gas pressure in the bearing, and a similar effect is also obtainable from embankments (not shown) projecting from the bearing surface. Meanwhile, the journal bearing member 18 is supported on one end of the elastic bodies 19 such as coil springs or the like, and another end of the springs 19 is fixed on the casing 15. The viscous damping body 20 such as oil, grease or the like is provided between the journal bearings and the casing with suitable seals (not shown) if needed.

Figure 4:
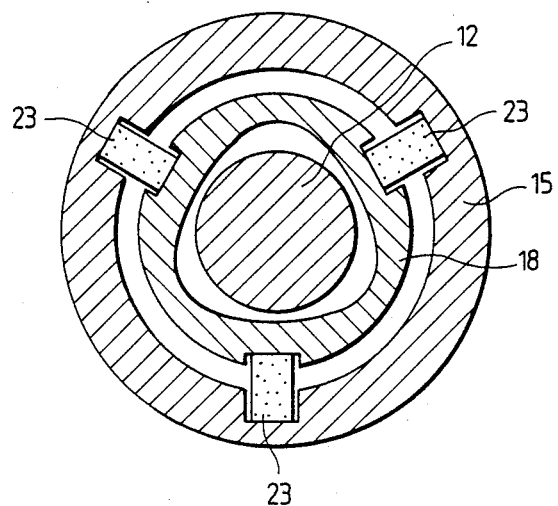
FIG. 4 is a sectional view similar to FIG. 2, of a bearing part given in another embodiment of the invention.
Figure 5:
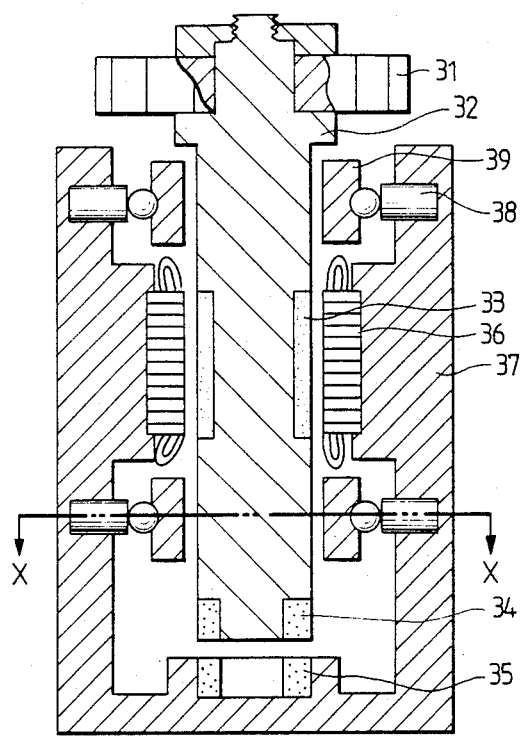
FIG. 5 is a longitudinal sectional view of a hypothetical rotating mirror light-deflecting system used to explain the present invention.
Figure 6:
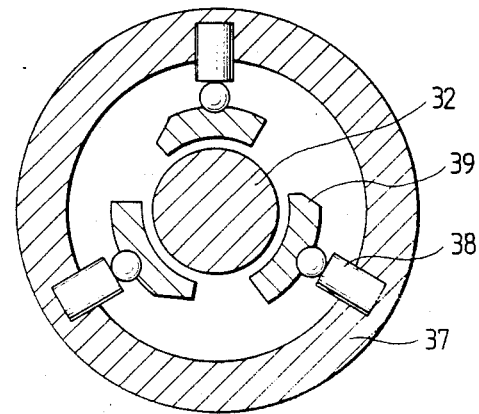
FIG. 6 is a sectional view taken on line X—X of FIG. 5.

FIG. 4 represents a construction wherein the rigid annular journal bearing member 18 is supported on a viscous, elastic and damping body 23 such as made from hysteresis damping rubber or the like. The shaft 12, the casing 15 and the journal bearing 18 are exactly the same as those of FIG. 2. In this system, the viscous elastic and damping body provides energy damping viscosity as well as movement absorbing or permitting elasticity, therefore it is not necessary to provide a viscous fluid such as oil or the like.

As described above, according to the invention, the non-circular dynamic pressure gaseous bearing with high rigidity is provided internally with a multiplicity of grooves to enhance rigidity, further supported on a spring or the like to be capable of moving in phase with the shaft, therefore the shaft will never come in contact with the bearing even from a violent oscillation at resonance. Then, a whirling oscillation capable of arising at speed of two times as high as the resonance frequency will be damped or attenuated immediately by the viscous or damping body provided outside the bearing, therefore resonance is almost not generated even up to super high-speed rotation of 150,000 to 200,000 rpm. Accordingly, a rotating mirror light deflecting system operating at super high speed of 100,000 rpm is now realized by the invention to reliably provide high speed scanning.

Further embodiments, variations and modifications are contemplated within the spirit and scope of the following claims.

We claim:

1. A light scanning system, comprising:
a shaft having an axis of rotation;
a motor magnet mounted on said shaft;
a rigid casing surrounding said shaft;
a motor stator mounted on said casing operatively adjacent said motor magnet;
a polygonal light reflecting mirror concentrically mounted on said shaft;
dynamic gas journal bearing means operatively between said shaft and said casing for rotationally mounting and radially supporting said shaft relative to said casing, said gas bearing means including a rigid annular bearing member separate from and between said casing and said shaft, said gas bearing means further including cooperatingly shaped surface means on the inside of said bearing member and the outside adjacent portion of said shaft for producing dynamic gas pressure therebetween during rotation of said shaft;
means for mounting said bearing member on said casing for relative radial movement in all radial directions and for preventing relative rotational movement, with respect to said axis;
resilient means between said bearing member and said casing providing resilient relative radial movement between said bearing member and said casing for preventing said shaft from contacting said bearing member during shaft movement relative to said casing at resonant frequency of the rotatable mass; and
energy absorbing means between said bearing member and said casing for damping relative movement between said casing and said bearing member during resonant frequency to substantially reduce amplitude of the relative movement at said resonant frequency.

2. The system according to claim 1, wherein said motor magnet and said motor stator constitute means for rotating said shaft at a speed greater than 100,000 rpm.

3. The system according to claim 2, wherein one of the surface means of said bearing member and said shaft is noncylindrical and the other is cylindrical.

4. The system according to claim 2, wherein said shaft and the structure mounted thereon constitute a rotating mass having a natural frequency and a whirling resonance frequency at approximately twice the natural frequency; and wherein said energy absorbing means substantially prevents whirling at said whirling resonance frequency.

5. The system according to claim 4, wherein said resilient means is a plurality of peripherally spaced springs and said energy absorbing means is a viscous fluid contained in an annular chamber between said casing and said bearing member.

6. The system according to claim 4, wherein said resilient means and said energy absorbing means is constituted by an elastomeric material with substantial hysteresis.

7. The system according to claim 4, wherein said resilient means and energy absorbing means are mounted at three equally spaced positions around the periphery of said shaft in a first annular array above said motor stator and motor magnet and a second annular array below said motor stator and said motor magnet.

8. The system according to claim 1, wherein said motor magnet and said motor stator constitute means for rotating said shaft at a speed greater than 150,000 rpm.

9. The system according to claim 1, further including said casing being generally cup shaped, and a magnetic thrust bearing between one axial end of said shaft and the adjacent portion of said casing.

10. The system according to claim 1, wherein one of the surface means of said bearing member and said shaft is noncylindrical and the other is cylindrical.

11. The system according to claim 10, further including a plurality of grooves in one of said surface means of said bearing member and said shaft to constitute means for enhancing dynamic gas pressure during rotation of said shaft.

12. The system according to claim 11, wherein said grooves are arranged in peripherally spaced relationship to each other in an annular array, with each groove of the array being elongated in the axial direction parallel to each other and at an acute angle With respect to the axial direction.

13. The system according to claim 12, wherein additional ones of said grooves are arranged in peripherally spaced relationship to each other in a second annular array, with each groove of the second array being elongated in the axial direction parallel to each other and at an acute angle symmetrical to the first mentioned acute angle, with respect to the axial direction.

14. A high speed motor system, comprising:
a shaft having an axis of rotation;
a motor magnet mounted on said shaft to define a rotatable mass;
a rigid casing surrounding said shaft;
a motor stator mounted on said casing operatively adjacent said motor magnet;
dynamic gas journal bearing means operatively between said shaft and said casing for rotationally mounting and radially supporting said shaft relative to said casing, said gas bearing means including a bearing member separate from and between said casing and said shaft, said gas bearing means further including cooperatingly shaped surface means on the inside of said bearing member and the outside adjacent portion of said shaft for producing dynamic gas pressure there between during rotation of said shaft;
means for mounting said bearing member on said casing for relative radial movement in all radial directions and for preventing relative rotational movement, with respect to said axis;
resilient means between said bearing member and said casing providing resilient relative radial movement between said bearing member and said casing for preventing said shaft from contacting said bearing member during shaft movement relative to said casing at resonant frequency of the rotatable mass;
energy absorbing means between said bearing member and said casing for damping relative movement between said casing and said bearing member during resonant frequency to substantially reduce amplitude of the relative movement at said resonant frequency;
said motor magnet and said motor stator constituting means for rotating said shaft at a speed greater than 100,000 rpm;
one of the surface means of said bearing member and said shaft being non-cylindrical and the other being cylindrical;
said shaft and the structure mounted thereon constituting a rotating mass having a natural frequency and a whirling resonance frequency at approximately twice the natural frequency; and
said energy absorbing means substantially preventing whirling at said whirling resonance frequency.

15. The system according to claim 14, wherein said bearing member is a single piece rigid construction.

16. The system according to claim 15, wherein said bearing member is annular.

17. A bearing system, comprising:
a shaft having an axis of rotation;
a motor magnet mounted on said shaft;
a rigid casing surrounding said shaft;
dynamic gas journal bearing means operatively between said shaft and said casing for rotationally mounting and radially supporting said shaft relative to said casing, said gas bearing means including a rigid annular bearing member separate from and between said casing and said bearing shaft, said gas bearing means further including cooperatingly shaped surface means on the inside of said bearing member and the outside adjacent portion of said shaft for producing dynamic gas pressure therebetween during rotation of said shaft;
means for mounting said bearing member on said casing for relative radial movement in all directions and for preventing relative rotational movement, with respect to said axis;
resilient means between said bearing member and said casing providing resilient relative radial movement between said bearing member and said casing for preventing said shaft from contacting said bearing member during shaft movement relative to said casing at resonant frequency of said shaft;
energy absorbing means between said bearing member and said casing for damping relative radial movement between said casing and said bearing member during resonant frequency to substantially reduce amplitude of the relative movement at said resonant frequency;
said motor magnet and said motor stator constituting means for rotating said shaft at a speed greater than 100,000 rpm;
one of the surface means of said bearing member and said shaft being non-cylindrical and the other being cylindrical;
said shaft and the structure mounted thereon constituting a rotating mass having a natural and a whirling resonance frequency at approximately twice the natural frequency; and wherein said energy absorbing means substantially prevents whirling at said whirling resonance frequency.

18. The system according to claim 17, wherein said motor magnet and said motor stator constitute means for rotating said shaft at a speed greater than 150,000 rpm.

19. The system according to claim 18, wherein said resilient means is a plurality of peripherally spaced springs and said energy absorbing means is a viscous fluid contained in an annular chamber between said casing and said bearing member.

20. The system according to claim 18, wherein said resilient means and said energy absorbing means is constituted by an elastomeric material with substantial hysteresis.

* * * * *